W. R. L. RAY.
RESILIENT WHEEL.
APPLICATION FILED MAY 31, 1912.
1,098,759.
Patented June 2, 1914.
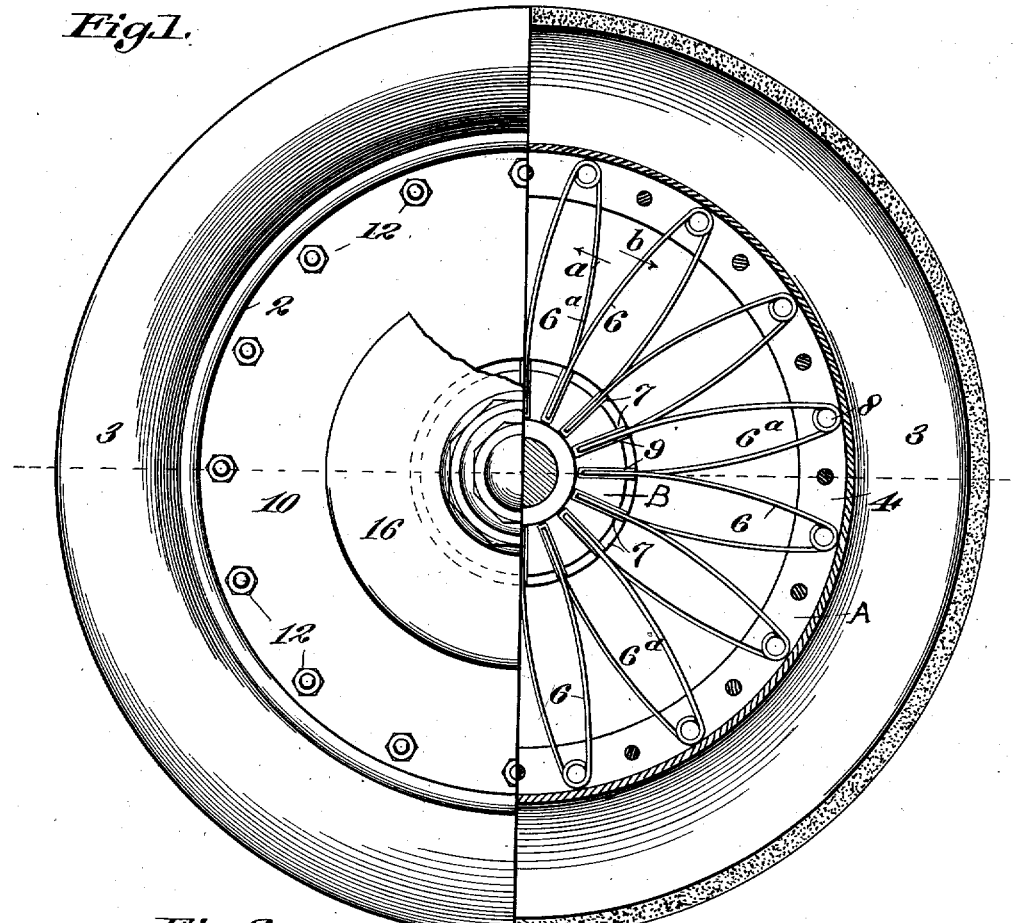
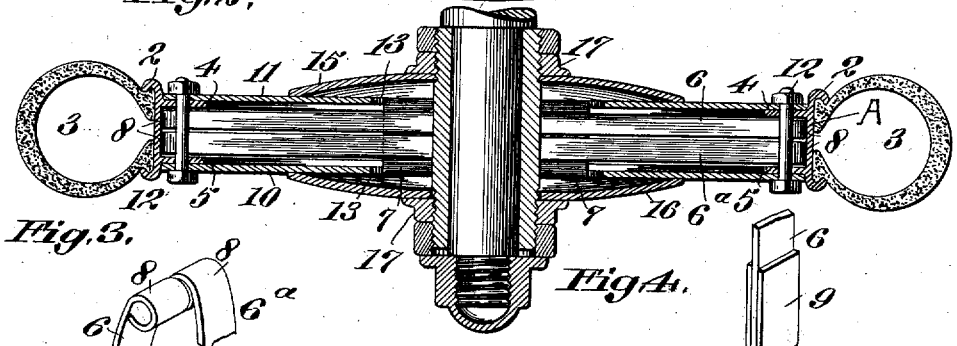
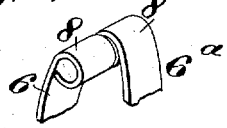
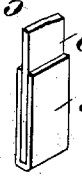
Witnesses:
Charles Pickles
Thos Eastley
Inventor:
William R. L. Ray.
By G. H. Strong. atty

UNITED STATES PATENT OFFICE.

WILLIAM R. L. RAY, OF FORT JONES, CALIFORNIA, ASSIGNOR OF ONE-HALF TO MAURICE M. ZELLE, OF SISSON, CALIFORNIA.

RESILIENT WHEEL.

1,098,759.        Specification of Letters Patent.        Patented June 2, 1914.

Application filed May 31, 1912. Serial No. 700,600.

*To all whom it may concern:*

Be it known that I, WILLIAM R. L. RAY, a citizen of the United States, residing at Fort Jones, in the county of Siskiyou and State of California, have invented new and useful Improvements in Resilient Wheels, of which the following is a specification.

My invention relates to improvements in wheels, and particularly pertains to resilient wheels that are especially applicable for use upon vehicles of the motor-driven type, in which power is applied directly through an axle against the friction of the wheel upon the ground.

It comprises a novel arrangement of a hub and rim with intermediate, curved, spring steel spokes, the manner of connecting said spokes with the hub and the rim, and in details of construction which will be more fully explained by reference to the accompanying drawings, in which—

Figure 1 is a front elevation of the wheel partly in section. Fig. 2 is a cross section of the wheel. Fig. 3 is a perspective view showing the construction of the outer ends of the steel spring spokes. Fig. 4 is a similar view of the inner end of a spoke, showing it as mounted in a shim.

Referring to the drawings, A indicates the rim of the wheel, which may be of any suitable construction. I have here shown it as comprising a clencher or other suitable circumferential portion 2 adapted to contain a tread 3, which may be the ordinary pneumatic tire, as shown, or a cushion tire of rubber or other suitable tough and resilient material. The rim A of the wheel is provided with two, inwardly extending, annular flanges 4 and 5 which form an annular channel adapted to receive the outer ends of curved steel spring spokes 6—6ª which are mounted at their inner ends in the hub portion B of the wheel; the outer ends of the spring spokes 6—6ª being unattached to the wheel rim, other than their frictional engagement therewith.

The hub portion of the wheel is formed with a number of radially disposed pockets or slots 7, designed to receive and carry the inner ends of the spokes 6—6ª; there being two of the spring spokes 6 and 6ª in each pocket or slot 7. The spokes 6—6ª are positioned so as to extend in opposite directions in relation to each other, as indicated by arrows *a* and *b* in Fig. 1; the object being to construct a wheel with spring spokes which will have equal tractive power in either direction. It can easily be seen that if the wheel is driven in the direction of the arrow *a* the tractive force would be thrown on the spokes 6ª around the whole circumference of the wheel and that the greater the force applied, the greater the tendency of the outer ends of the spokes to grip or cling to the inner face of the rim portion A of the wheel. The outer ends of the spokes are formed or shaped with loops, as 8, shown in Fig. 3, to give the spokes a greater contact area with the rim to prevent as much as possible any slipping or sliding between the rim and spokes.

In order to protect the radial slots in the hub portion of the wheel in which the springs are mounted from excessive wear or cutting by the steel spring spokes, I have shown the inner ends of the spokes as being provided with metal shims 9 which will take the wear and protect the slots in the hub portion. These may be replaced from time to time when necessary.

In some instances it may prove of great advantage to inclose the steel spring spokes to protect them from exposure to the elements and also to prevent water and dust from entering, which would cause wear and cutting in the moving parts of the spokes and contacting surfaces. When it is desired to inclose the spokes, it is only necessary to apply two side plates 10 and 11, which may be secured by bolts 12 passing through the annular, projecting flanges 4 and 5 of the rim portion. These side plates 10—11 are provided with annular openings 13 which are large enough to permit the hub to play. The annular openings 13 are also covered by plates 15 and 16 which are held in contact with the before mentioned plates by nuts 17 mounted on the main hub of the wheel. The spindle may be of any suitable construction and may be provided with roller bearings when so desired.

The operation of the wheel will be as follows: A wheel being constructed in this way, the power is applied by means of a motor, of any suitable description, to the hub or inner portion of the wheel. The tendency of the power thus applied is to cause the outer ends of the spring spokes to contact with the rim portion A of the wheel to drive same. The area of that portion of the spokes contacting with the rim portion is sufficient to adhere to the rim; this being caused by the tension of the spokes which may be increased by providing different lengths of spokes or heavier material. The resiliency of the spokes is such that whenever a wheel rolling upon the ground comes in contact with an obstruction, the springs upon that side will momentarily yield and absorb the shock by sliding downward; while the opposing springs and the springs under tension will serve to return the hub to its central position. Another advantage is that when traveling upon rough roads the wheels drop into depressions in the roadway, the instant yielding of the springs acts in a measure as a shock absorber; the wheel following inequalities in the road surface without materially affecting the position of the hub portion. As the wheel continues to rotate, the pressure is successively or gradually changed, thereby distributing the load from one spoke to another continuously.

Having thus described my invention, what I claim and desire to secure by Letters Patent is—

In a resilient wheel in combination, a rim, a series of pairs of leaf spring spokes entirely disconnected from each other, each spoke terminating in a reversely formed loop having frictional engagement with the rim, the loops of each pair of springs being normally side by side in a common plane contacting with the rim, a hub provided with slots, and the ends of each pair of spokes being retained in adjacent slots in the hub to constitute a construction wherein the spokes of each pair curve away from a vertical plane passing through the axis of said wheel and the normal points of frictional engagement of said loops to said rim.

In testimony whereof I have hereunto set my hand in the presence of two subscribing witnesses.

WILLIAM R. L. RAY.

Witnesses:
JACOB P. WETZEL,
GEORGE R. ATTEBERY.

Copies of this patent may be obtained for five cents each, by addressing the "Commissioner of Patents, Washington, D. C."